(12) United States Patent
Jain et al.

(10) Patent No.: US 10,652,047 B2
(45) Date of Patent: May 12, 2020

(54) CONNECTIVITY TO INTERNET VIA SHARED SERVICES IN ENTERPRISE FABRIC BASED NETWORK WITH LISP CONTROL PLANE

(71) Applicant: Cisco Technology, Inc., San Jose, CA (US)

(72) Inventors: Prakash Chand Jain, Fremont, CA (US); Sanjay Kumar Hooda, Pleasanton, CA (US); Victor M. Moreno, Carlsbad, CA (US); Satish Kumar Kondalam, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 48 days.

(21) Appl. No.: 16/010,444

(22) Filed: Jun. 16, 2018

(65) Prior Publication Data

US 2018/0367337 A1 Dec. 20, 2018

Related U.S. Application Data

(60) Provisional application No. 62/522,005, filed on Jun. 19, 2017.

(51) Int. Cl.
*H04L 12/46* (2006.01)
*H04L 12/741* (2013.01)

(52) U.S. Cl.
CPC ...... *H04L 12/4633* (2013.01); *H04L 12/4625* (2013.01); *H04L 45/74* (2013.01); *H04L 2212/00* (2013.01)

(58) Field of Classification Search
CPC . H04L 12/4633; H04L 45/74; H04L 2212/00; H04L 12/4625
See application file for complete search history.

(56) References Cited

U.S. PATENT DOCUMENTS

| | | | | |
|---|---|---|---|---|
| 2011/0113236 A1* | 5/2011 | Chenard | ............. | H04L 63/0471 713/154 |
| 2013/0287026 A1* | 10/2013 | Davie | ..................... | H04L 49/70 370/392 |
| 2015/0124821 A1* | 5/2015 | Chu | ........................ | H04L 45/22 370/392 |
| 2016/0164832 A1* | 6/2016 | Bellagamba | ............ | H04L 67/10 726/12 |

* cited by examiner

*Primary Examiner* — Walli Z Butt
(74) *Attorney, Agent, or Firm* — Merchant & Gould P.C.

(57) ABSTRACT

In one embodiment, a method is performed at a first node. The method may include receiving, at a first node, a request from a source host associated with a network to communicate with a destination host. The first node may determine whether the destination host is associated with the network. If the destination host is not associated with the network, the first node may determine an instance identifier (IID) and a proxy egress tunnel router (PETR) locator address used to communicate with the destination host. The first node may send an indicator to an ingress tunnel router (ITR) to encapsulate a packet with the IID and the PETR locator address before sending the packet from the source host to the destination host.

20 Claims, 6 Drawing Sheets

US 10,652,047 B2

CONNECTIVITY TO INTERNET VIA SHARED SERVICES IN ENTERPRISE FABRIC BASED NETWORK WITH LISP CONTROL PLANE

TECHNICAL FIELD

The present disclosure generally relates to data routing of extranet flows in fabric networks.

BACKGROUND

When using shared services in an enterprise fabric network, internet connectivity may not work in a traditional manner. For example, internet connectivity may not work because the client endpoint-identifiers and the default gateway (e.g., to connect to external internet sites, DNS, DHCP, authentication server, etc.) may be in different virtual networks.

BRIEF DESCRIPTION OF THE DRAWINGS

For an understanding of aspects of various embodiments described herein and to show how they may be carried into effect, reference is made, by way of example only, to the accompanying drawings.

DESCRIPTION OF EXAMPLE EMBODIMENTS

Overview

Figure 1:
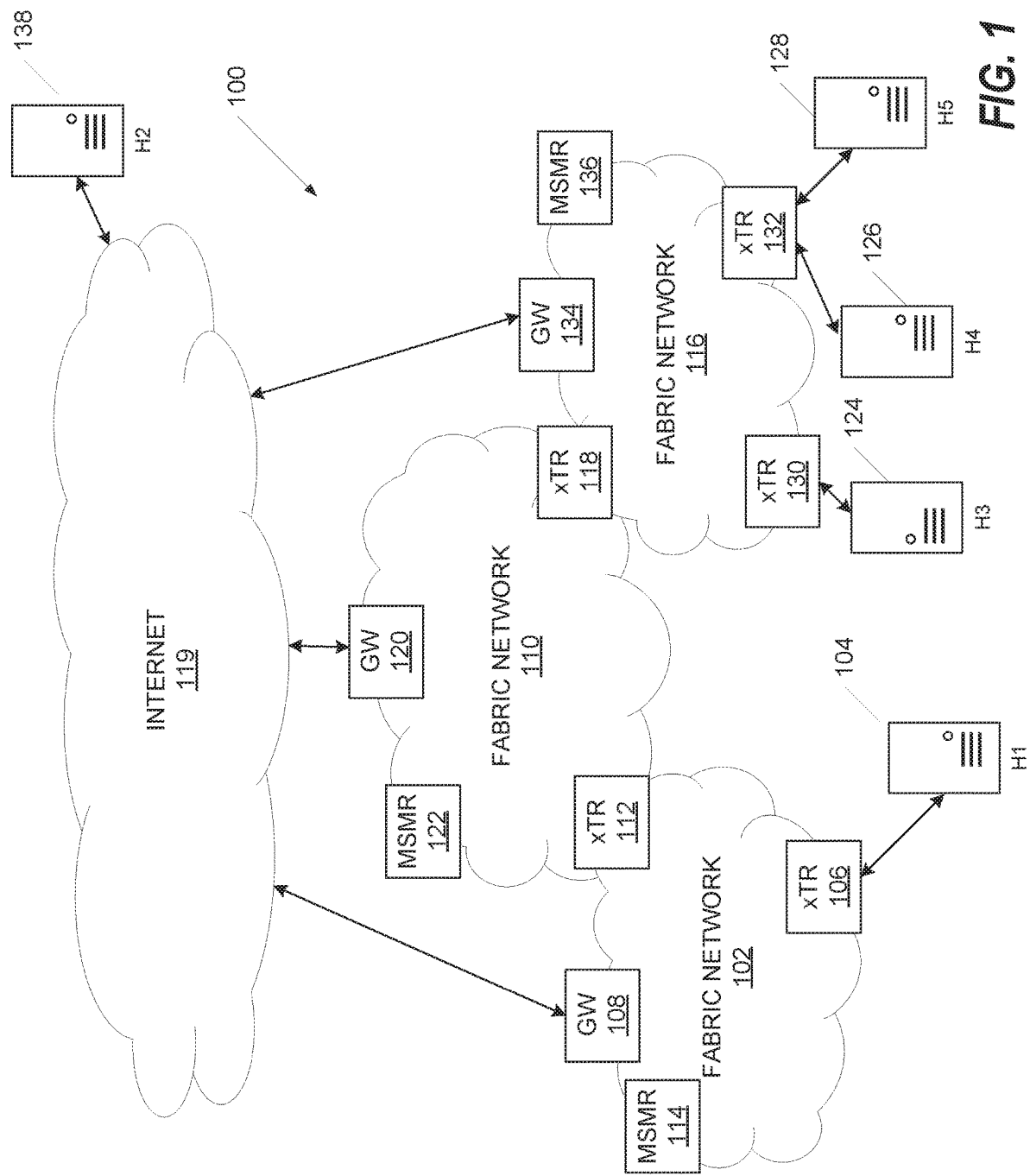
FIG. 1 is a diagram that illustrates an example system that may use a locator/identifier separation protocol (LISP) instance leaking or extranet feature.

Numerous details are described in order to provide a thorough understanding of the example embodiments shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example embodiments described herein.

Various embodiments disclosed herein may include devices, systems, and methods for sending and receiving a packet in a fabric network. For example, the method may include receiving, at a first node, a request from a source host associated with a network to communicate with a destination host. The first node may determine whether the destination host is associated with the network. If the destination host is not associated with the network, the first node may determine an instance identifier (IID) and a proxy egress tunnel router (PETR) locator address used to communicate with the destination host. The first node may send an indicator to an ingress tunnel router (ITR) to encapsulate a packet with the IID and the PETR locator address before sending the packet from the source host to the destination host.

EXAMPLE EMBODIMENTS

In some implementations, a method may include generating Locator/Identifier Separation Protocol (LISP) negative map replies (NMRs) or modified NMRs from a map server to edge nodes with appropriate NMR prefixes, proxy egress tunnel router locator addresses, and virtual network identifiers so that edge nodes using their configuration can send the packets to a gateway in a correct virtual network, which may be connected to an external network, such as the internet.

In some implementations, the method may include exporting the routes for fabric endpoints of multiple virtual networks in an enterprise network to an external network (e.g., an outside fabric or the internet). Traffic destined to fabric endpoints across, e.g., different virtual networks can be attracted towards fabric that may be connected to the external network.

In some implementations, the method may facilitate connectivity to unknown networks in the fabric (e.g., the network may only be used to provide connectivity to the unknown networks in the fabric). Known networks (e.g., the fabric networks) may use support for virtual routing and forwarding (VRF) between VRF instances, e.g., inter VRF support, to facilitate connectivity, as described, for example, in Moreno et al., "LISP Virtual Private Networks (VPNs)," which is available at https://tools.ietf.org/html/draft-moreno-lisp-vpn-00.

In some implementations, when a host wants to communicate to an external network (e.g., an unknown network), the fabric edge, e.g., an ingress tunnel router (ITR) device, may send a request to a LISP mapping system, e.g., a map server map resolver (MSMR) device. The request may include a prefix, e.g., a destination prefix. The LISP mapping system may send back a modified negative map reply (NMR) or unknown map reply (UMR) for prefixes that are not yet registered with the mapping system or for prefixes that are from non-LISP sites.

In some implementations, non-LISP sites may be accessible via a shared or provider virtual network or instance identifier (IID) that may use extranet communication. The ITR may determine (e.g., may identify) the remote proxy egress tunnel router (PETR) and virtual network (e.g., IID) in which the ITR may send the packets so that the communication to the external (e.g., unknown) network can work.

In some implementations, the ITRs may be configured with the IID of the shared extranet virtual network.

In some implementations, the NMR or UMR may carry a shared or provider IID as a destination or encapsulation IID.

In some implementations, the covering prefix calculation may change in the case of a NMR. For example, the actual covering prefix returned in an NMR may depend on the number and distribution of EID prefixes in the mapping system across virtual networks. The NMR prefix may cover the shortest prefix that does not cover any LISP sites in the mapping system.

The covering prefix may be calculated based on various IIDs (e.g., all the IIDs) with which the source IID is shared with in the extranet. Calculating the covering prefix based on various IIDs may help ensure that the correct covering prefix is returned in the source IID and that no black-holing of traffic occurs across the system.

In some implementations, the ITRs may be configured with the remote locator address of a provider of the shared extranet virtual network.

In some implementations, if a destination prefix does not exist, or if the destination prefix is not in any of the configured or registered prefix ranges at the mapping system, then a tunnel router (e.g., xTR) may use a proxy egress tunnel router (PETR) (e.g., 'use-petr') configuration to determine the encapsulation IID to forward packets to a proxy tunnel router (e.g., pxTR) as described herein. In some implementations, a use-petr command line interface (CLI) at the tunnel router for its shared virtual network may be extended to a configured IID of a default or shared VRF at the PETR. The IID may be used as an encapsulation IID to encapsulate the packets sent towards the proxy tunnel router as a result of NMR. The IID in the use-petr configuration may be the IID of the default (e.g., shared) VRF that may provide external internet connectivity at the proxy tunnel router. For example, the use-petr CLI under a service instance may be or may include: Extended CLI: use-petr 4.4.4.4 instance-id 5000 priority 1 weight 100

In some implementations, the NMR or UMR may carry a shared provider IID and remote PETR locator address. Based on the provider and consumer IIDs configured at the mapping system, the NMR may carry the IID of the shared VRF (IID). Such implementations may avoid extension of the use-petr configuration and may work dynamically based on the configuration at the mapping system.

The present disclosure includes devices, methods, and/or systems for handling traffic from unknown networks (e.g., external networks, such as the internet) to an enterprise fabric extranet (e.g., a shared virtual network).

Communication in a reverse direction (e.g., from unknown or external networks to an enterprise fabric) may be achieved by exporting to the outside fabric the configured prefixes or prefix range of the extranet on the mapping system. Fabric endpoints of the shared virtual networks (e.g., all shared virtual networks) may be covered. Traffic destined to all fabric endpoints across virtual networks can be attracted towards fabric from external networks with fewer (e.g., minimum) route or ternary content addressable memory (TCAM) entries.

The present disclosure includes devices, methods and/or systems for communicating with (e.g., accessing) networks outside an enterprise fabric with an extranet.

The present disclosure provides devices, methods, and/or systems for communicating with an external network (e.g., a network associated with an unknown prefix) in an enterprise fabric environment with extranet connectivity without the use of a fusion router for unknown subnets. Communication with the external network may be achieved by specifying one of the IIDs as the external connectivity IID. The specified IID in the fabric may be used for connectivity with any external fabric. Advantageously, the present disclosure provides devices, methods, and/or systems that may reduce the need for a fusion router.

In some implementations, connectivity to a host associated with an unknown network may be provided via a virtual network, such as a virtual public network (VPN). Other virtual networks may be allowed to use this virtual network.

The Locator/ID Separation Protocol (LISP) protocol may be used as an overlay protocol in a secure campus fabric and a software defined access (SDA) architecture for enterprise and data center networks. Virtual routing and forwarding (VRF), virtual private networks (VPNs), and/or virtual local area networks (VLANs), collectively known as VRF/VPN/VLANs, may be used to provide segmentation, isolation, and security among various sections of such networks. Secured VRF/VPN/VLANs may not communicate across one another. For example, an enterprise in software service business can serve various customers or clients from the same campus. Different clients/customers may need isolation or security from each other. However, the serving enterprise might have some shared resources (e.g., DNS, printers, servers, etc.) that it may share across all clients without compromising security or isolation between customers or clients. Clients (e.g., subscribers) and enterprise-shared resources (e.g., provider) may use inter-VRF/VPN/VLAN communication to facilitate sharing of resources while maintaining isolation among the clients. Such subscriber-to-provider communication may be known as extranet communication.

LISP may allow (e.g., may only allow) communication among hosts that are part of the same VRF, VPN, or VLAN or across VRFs, VPNs, or VLANs. For example, hosts H1 and H2 may be in a first VRF, VRF/IID A, and hosts H11 and H22 may be in a second VRF, VRF/IID B. The hosts in VRF/IID A and VRF/IID B may access shared services from server H3 in shared VRF/IID S.

LISP-learned mappings may be kept within the same IID or VRF context and not across multiple IIDs or VRFs. Two hosts, e.g., a subscriber and a provider, may want to communicate with each other across different IIDs. A LISP VRF/VPN/VLAN or IID leaking feature or a LISP extranet feature may support inter VRF/VPN/VLAN communication. This feature may support leaking across VRF IIDs or VLAN IIDs.

The present disclosure discloses devices, methods, and/or systems that may implement a software architecture. FIG. 1 illustrates an example system 100 that may use a LISP instance leaking or extranet feature. A campus fabric network 102 may be in communication with a host 104 via a tunnel router (e.g., xTR) 106. The campus fabric network 102 may have a connection to an external network, such as the internet, via a gateway router 108. The campus fabric network 102 may be in communication with another campus fabric network 110 via a tunnel router 112.

Tunnel routers 106 and 112 and gateway router 108, as well as other routers disclosed herein, may be implemented as edge routers, ingress tunnel routers (ITRs), egress tunnel routers (ETRs), proxy ingress tunnel routers (PITRs), proxy egress tunnel routers (PETRs), and/or border routers. Ingress and egress tunnel routers may be collectively known as xTRs. PITRs and PETRs may be collectively known as pxTRs. ETRs may detect local hosts and prefixes and may register them in corresponding source IIDs. ITRs may generate map requests for destination prefixes in the context of source IIDs. The present disclosure discloses devices, methods and/or systems that may implement various software features. Software features may be implemented as computer-readable or processor-readable instructions that may be stored or included in a memory that may be accessed or read by a processor or computing device, including, but not limited to, one or more tunnel routers 106 and 112 or gateway router 108.

Devices, such as hosts and/or tunnel routers, may be registered to or associated with VRF IIDs. A map server map resolver (MSMR) 114, which may be implemented, for example, as a MSMR device or as part of a gateway router, may store and/or manage registrations of VRF IIDs to devices. Software features may be implemented as computer-readable or processor-readable instructions that may be stored or included in a memory that may be accessed or read by a processor or computing device, including, but not limited to, an MSMR device or a gateway router.

A MSMR policy-based architecture may support a LISP extranet or IID leaking feature. A MSMR policy-based architecture may facilitate routing among endpoint identifier (EID) prefixes by forwarding or replying map requests from tunnel routers. The MSMR 114 may decide leaking across VRFs, VPNs, and/or VLANs, based on its extranet policy. Prefixes in the extranet policy can be populated from a configured prefix list, for example, with an extranet command line interface (CLI) or from dynamic registrations by tunnel routers (e.g., xTRs) if the extranet CLI does not have a prefix configured. The extranet policy may support CLI-configured prefixes. The extranet policy may support dynamic configuration. The architecture flow may include one or more operations described herein.

The fabric network 110 may be in communication with another fabric network 116 via a tunnel router 118. The fabric network 110 may also be in communication with hosts (not shown) via other tunnel routers. The fabric network 110 may be in communication with an external network, such as the internet 119, via a gateway router 120. A MSMR 122 may store and/or manage registrations of VRF IIDs to devices that are in communication with the fabric network 110.

The fabric network 116 may be in communication with hosts 124, 126, 128 via tunnel routers 130, 132. The fabric network 116 may be in communication with an external network, such as the internet 119, via a gateway router 134. A MSMR 136 may store and/or manage registrations of VRF IIDs to devices that are in communication with the fabric network 116.

In some implementations, when the host 104 wishes to communicate with a host 138 that is in communication with the external network, e.g., the internet 119, the host 104 may send the MSMR 114 a request to communicate with the host 138.

A MSMR policy-based architecture may support a LISP extranet or IID leaking feature. A MSMR policy-based architecture may facilitate routing among endpoint identifier (EID) prefixes by forwarding or replying map requests from ITRs. The MSMR 114 may decide leaking across VRFs, VPNs, and/or VLANs, based on an extranet policy. Prefixes in the extranet policy can be populated from a configured prefix list, for example, with an extranet command line interface (CLI) or from dynamic registrations by tunnel routers (e.g., xTRs) if the extranet CLI does not have a prefix configured. The extranet policy may support CLI-configured prefixes. The extranet policy may support dynamic configuration. The architecture flow may include one or more operations described herein.

Figure 2:
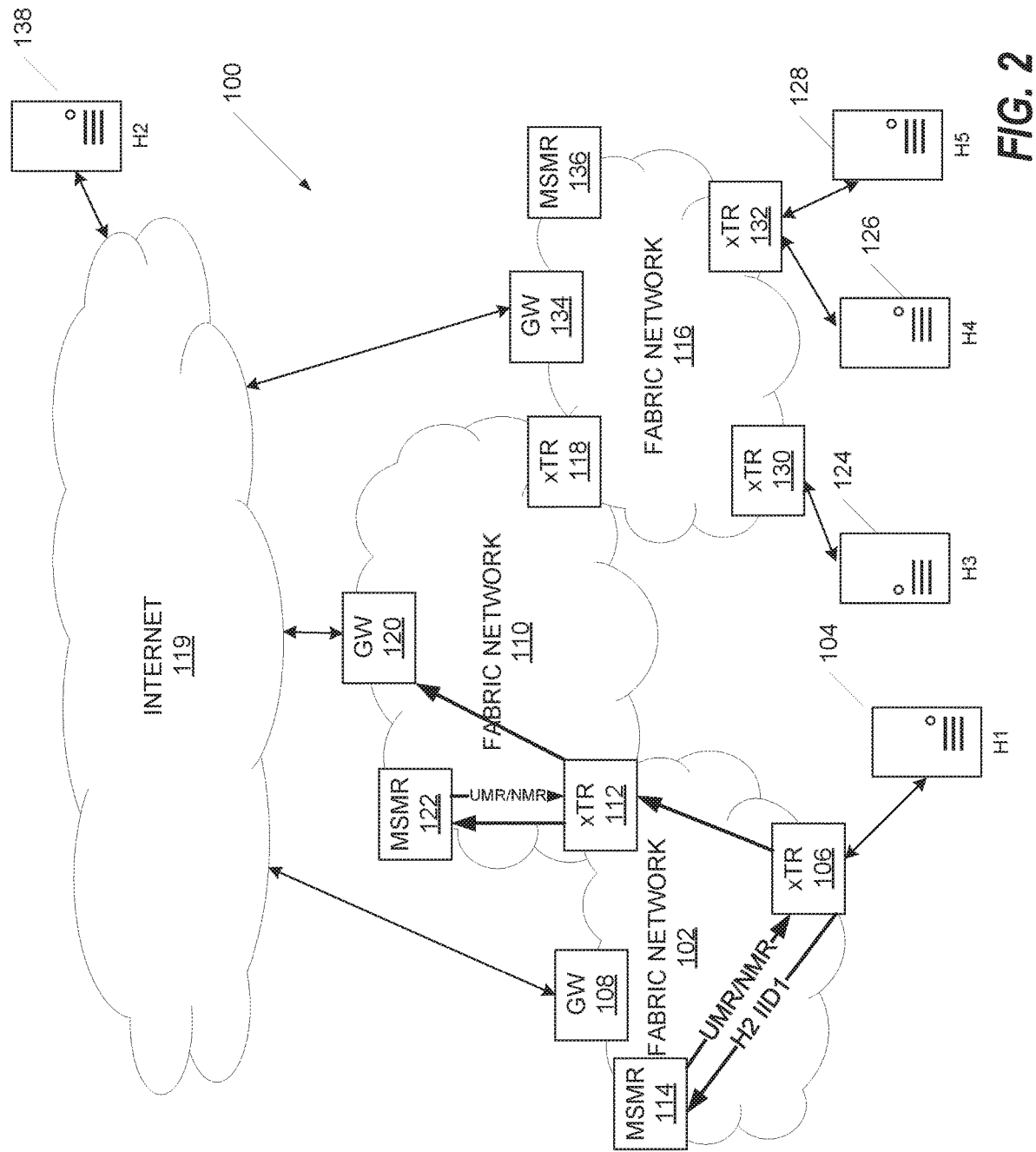
FIG. 2 is a diagram that illustrates an example message exchange in the example system of FIG. 1.

FIG. 2 illustrates an example message exchange that may occur in the system 100 of FIG. 1 when the host 104 wishes to communicate with the host 138. The host 104 may send the MSMR 114 a request to communicate with the host 138. This request, e.g., a map request, may identify the host 104 as the source host and the host 138 as the destination host.

The MSMR 114 may determine whether the destination host, e.g., the host 138, is associated with the same network with which the source host, e.g., the host 104, is associated. If the destination host is not associated with the same network, the MSMR 114 may determine an instance identifier (IID) that may be used to communicate with the destination host.

The MSMR 114 may look up an extranet policy table. For example, when replying to a map request, if the MSMR 114 does not find the destination EID or prefix in the source IID context, it may look up the prefix in its extranet policy table to determine the destination IID. The MSMR 114 may look up the destination prefix in the destination IID context. If the destination prefix is found, the MSMR 114 may still reply with the map reply in the source IID context.

The MSMR 114 may add an indicator, such as an additional parameter, e.g., the destination IID and/or PETR locator address, as an encapsulation IID in the map reply. The map reply may be an unknown map reply (UMR), which may indicate that the EID of the destination host is unknown.

A packet may be encapsulated with the encapsulation IID before it is sent from the source host to the destination host. The MSMR 114 may proxy reply on behalf of an ETR for extranet, e.g., instead of forwarding the request to the ETR.

In an embodiment, the MSMR 114 may use the unknown map reply to cause the packet to be routed through the tunnel router 112, the fabric network 110, and the gateway router 120 to reach the internet 119 and the host 138, e.g., rather than through the gateway router 108. The need for the gateway router 108 may be obviated. Accordingly, connectivity to the internet 119 may be provided through shared services in an enterprise fabric-based network via a LISP control plane. This may facilitate reducing the number of gateway routers that may be deployed in the system 100, which may reduce costs and improve security.

Figure 3:
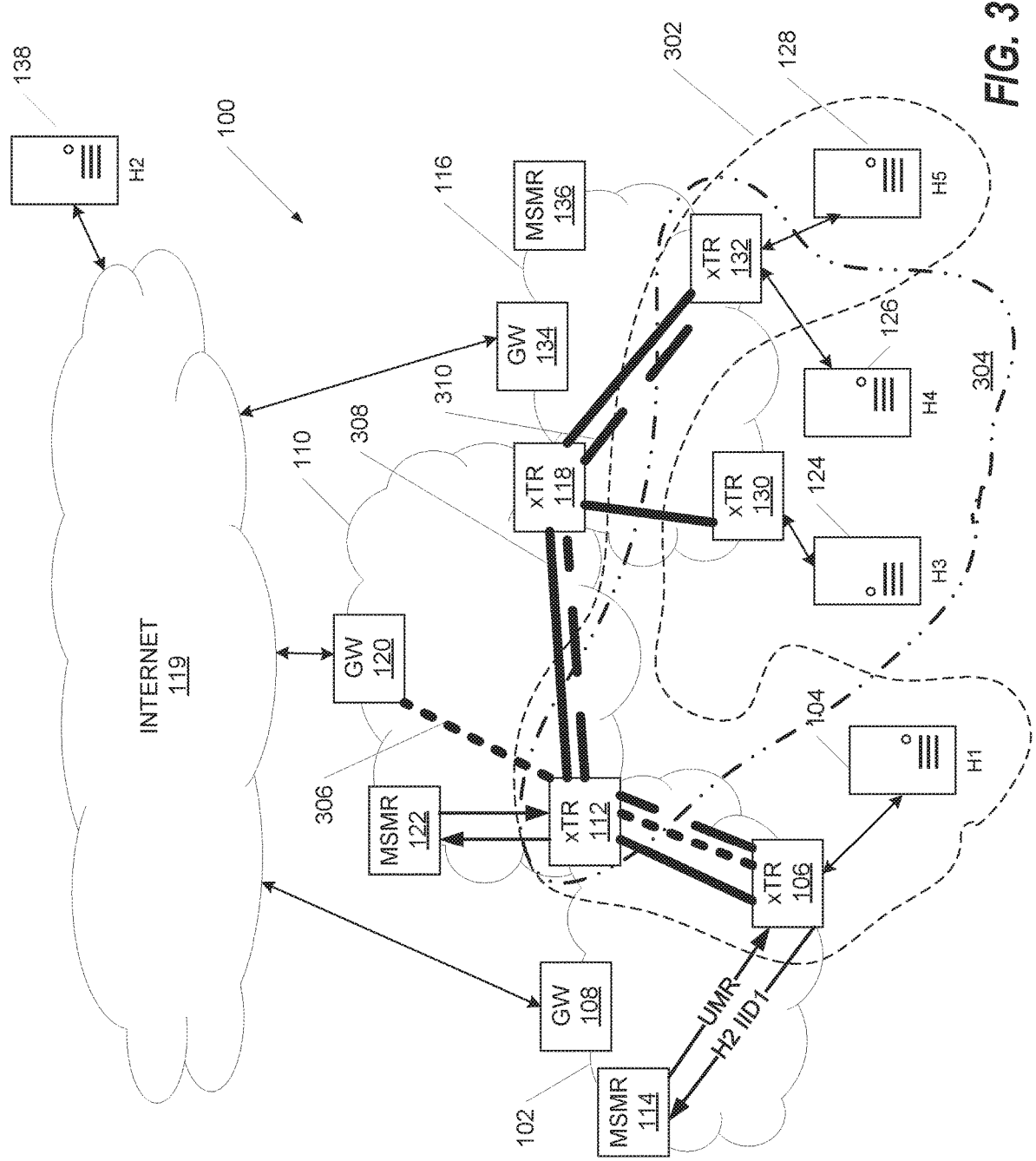
FIG. 3 is a diagram that illustrates example virtual private networks (VPNs) and VPN tunnels that may be used in connection with the example system of FIG. 1.

FIG. 3 illustrates example virtual private networks (VPNs) and VPN tunnels that may be used in connection with the system 100. As shown in FIG. 3, for example, hosts 104 and 128 and tunnel routers 106, 112, 118, and 132 may form a first VPN 302, which may be associated with an instance identifier, such as IID1. Hosts 124 and 126 and tunnel routers 118, 130, and 132 may form a second VPN 304, which may be associated with another instance identifier, such as IID2.

Both VPNs 302 and 304 may include tunnel router 112 and 118. The MSMR 122 may store an extranet policy that may specify that packets destined for an external network, such as the internet 119, should be routed through the gateway router 120.

By including an IID associated with VPN 302 or VPN 304, a MSMR, such as the MSMR 114 or the MSMR 136, may direct packets destined for an external network, such as the internet 119, to be routed through the gateway router 120. This may establish one or more VPN tunnels 306, 308, 310 that may be used to provide connectivity to the internet 119 through the campus fabric network 110.

Figure 4:
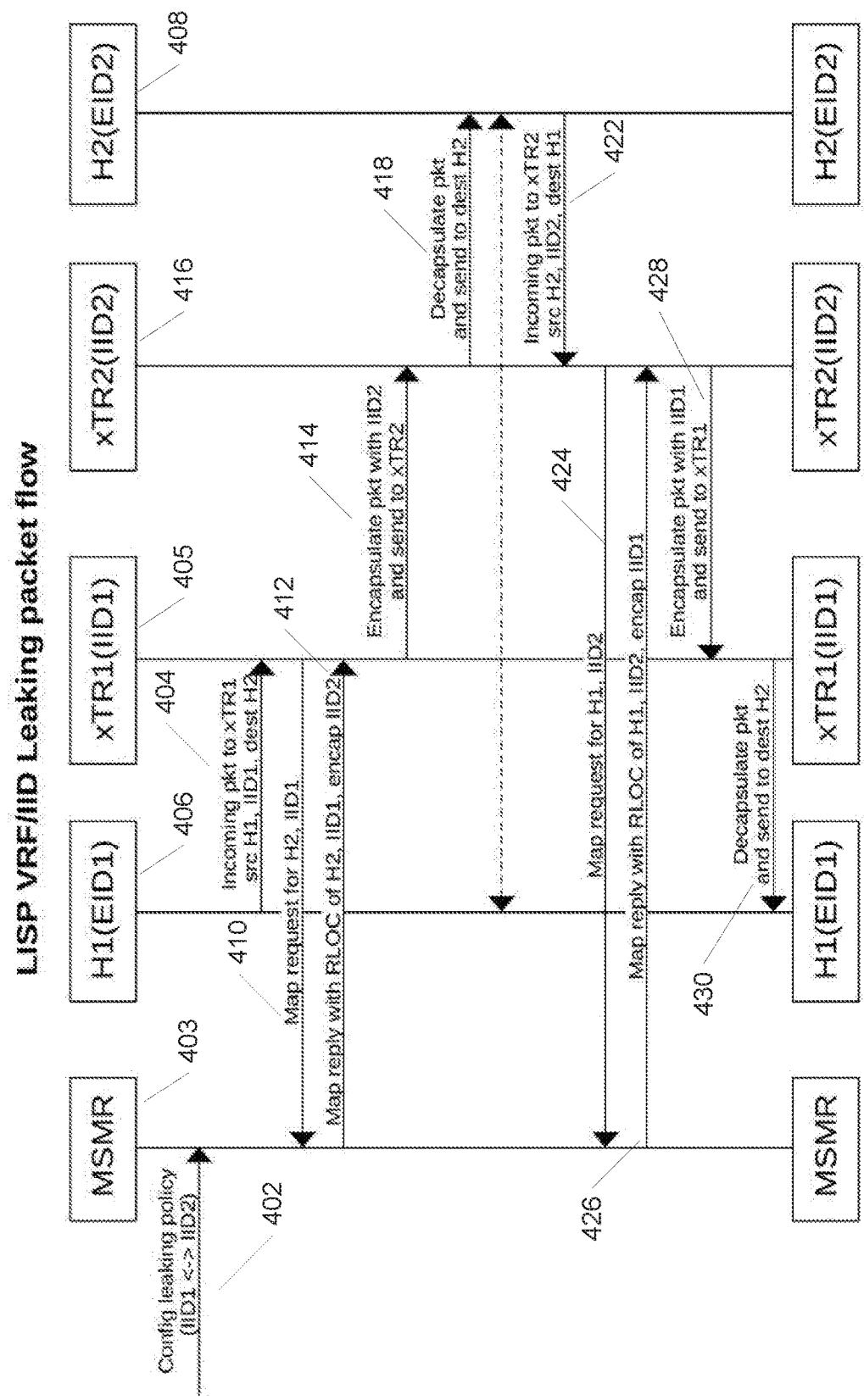
FIG. 4 is a flow diagram that illustrates an example LISP VRF/IID leaking packet flow.

FIG. 4 illustrates an example LISP VRF/IID leaking packet flow, which may be implemented, for example, as a LISP extranet unicast packet flow. At 402, a leaking policy (e.g., between IID1 and IID2) may be configured at a MSMR 403. At 404, an incoming packet may arrive at a tunnel router 405, which may be associated with IID1. The incoming packet may specify a source host 406, which may be associated with an endpoint identifier (EID) EID1, an IID IID1, and a destination host 408. At 410, the tunnel router 405 may send a map request to the MSMR 403. The map request may specify the destination host 408 in the context of IID1.

The MSMR may respond with a map reply at 412. The map reply may include a routing locator (RLOC) of the destination host 408 in IID1 and may specify IID2 as an encapsulation IID. At 414, the tunnel router 405 may encapsulate the packet with IID2 and may send the encapsulated packet to a tunnel router 416, which may be associated with IID2.

At 418, the tunnel router 416 may decapsulate the packet and send the decapsulated packet to the destination host 408, which may be associated with an endpoint identifier (EID) EID2. Data may be communicated between the destination host 408 and the source host 406.

At 422, host H2 may send an incoming packet to the tunnel router 416. The packet may specify the host 408 as a source host, an IID IID2, and the host 406 as a destination host. At 424, the tunnel router 416 may send a map request for the host 406 in the IID2 context to the MSMR 403. The MSMR 403 may reply with a map reply at 426. The map reply may include a routing locator (RLOC) of the host 406 in IID2 and may specify IID1 as an encapsulation IID. At 428, the tunnel router 416 may encapsulate the packet with IID1 and may send the encapsulated packet to tunnel router 405. The tunnel router 405 may decapsulate the packet and send the decapsulated packet to destination host H1 at 430.

Figure 5:
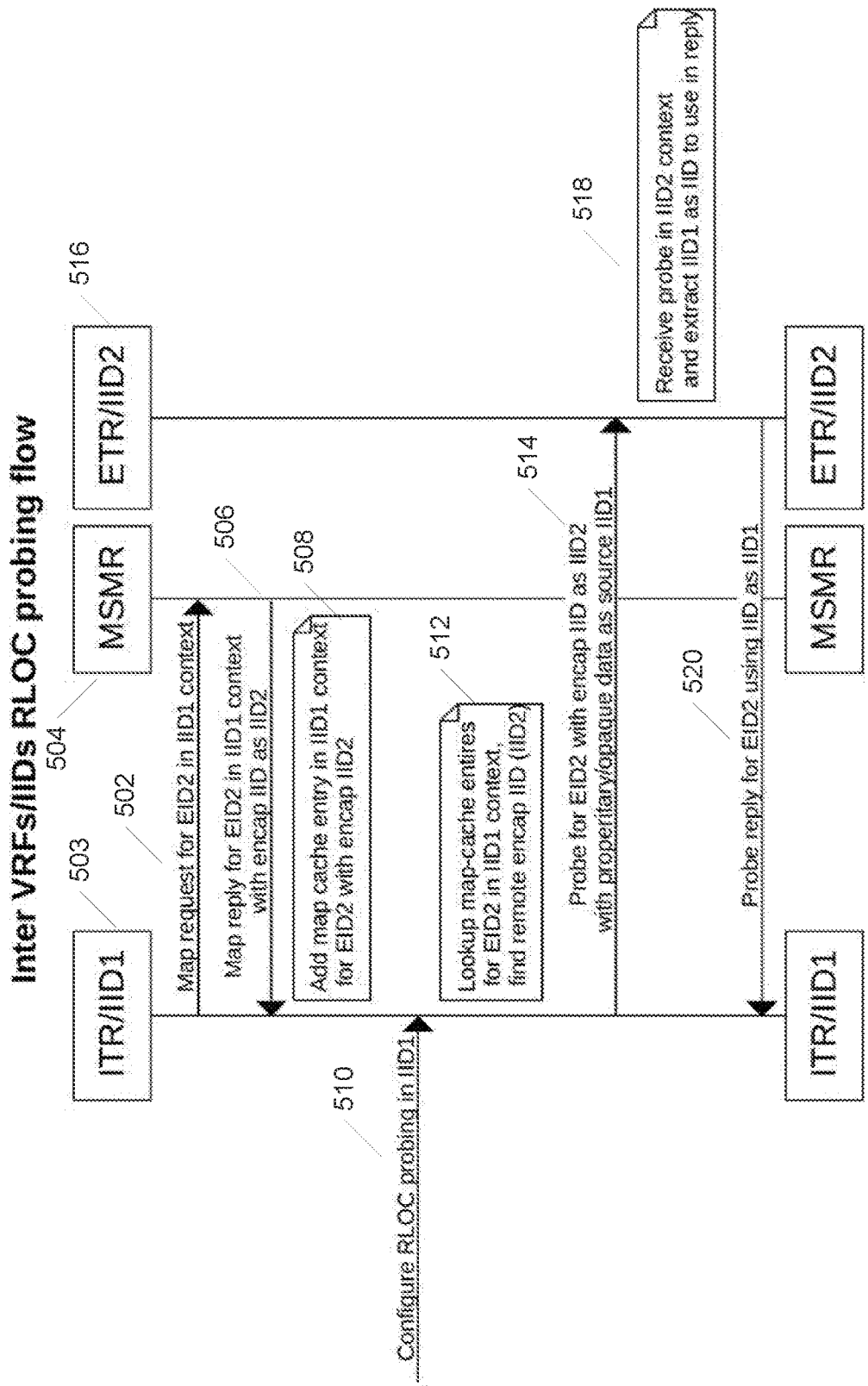
FIG. 5 is a flow diagram that illustrates an example inter VRFs/IIDs routing locator (RLOC) probing flow.

FIG. 5 illustrates an example inter VRFs/IIDs RLOC probing flow. At 502, an ingress tunnel router (ITR) 503 associated with IID1 may send an MSMR 504 a map request for EID2 in the IID1 context. At 506, the MSMR 504 may reply with a map reply for EID2 in the IID1 context and may specify IID2 as an encapsulation IID. The ITR 503 may add a map cache entry in the IID1 context for EID2 with an encapsulation IID of IID2 at 508. At 510, RLOC probing may be configured in IID1 in the ITR 503.

At 512, the ITR 503 may look up map cache entries for EID2 in the IID1 context. The ITR may find the remote encapsulation IID, e.g., IID2. At 514, the ITR may send an egress tunnel router (ETR) 516, which may be associated with IID2, a probe for EID2 with IID2 as an encapsulation IID. The probe may be sent with proprietary or opaque data as the source IID1. At 518, the ETR 516 may receive the probe in the IID2 context and may extract IID as the endpoint identifier IID to use in a probe reply. The ETR 516 may send a probe reply to the ITR 503 for EID2 using the endpoint identifier IID as IID1 at 520.

The MSMR may send a negative map reply (NMR) for prefixes that are either not yet registered with the MSMR or from non-LISP sites. Non-LISP sites may be accessible via a shared or provider IID that may use extranet communication. A NMR may carry a shared or provider IID as a destination or encapsulation IID.

The actual covering prefix returned in an NMR may depend on the number and distribution of EID prefixes in the mapping system, e.g., the MSMR. The NMR prefix may cover the shortest prefix that does not cover any LISP sites in the mapping system.

If the source IID is one of the extranet IIDs, NMR prefix calculation may be done using the extranet policy table for the source IID. The prefix calculation may be based on registered prefixes of all IIDs of the extranet, e.g., for dynamic registrations.

If the destination prefix exists in the extranet policy table, the NMR may include a destination or encapsulation IID, which may be encoded, for example, using LISP canonical address format (LCAF) encoding, e.g., with a dedicated LCAF type. Encoding of the IID in the NMR may be similar to encoding of an IID in a map reply message. The NMR may be recognized by the number of locator records. A locator record may not be used to encode an extra IID.

If the destination prefix does not exist or is not in any of the configured or registered prefix ranges, the tunnel router may use a proxy ETR configuration (e.g., a 'use-petr' configuration) to get an encapsulation IID to forward packets to a proxy tunnel router.

For example, in some implementations, a 'use-petr' command line interface (CLI) at a tunnel router for an extranet may include the option of configuring the IID of the default or shared VRF at the proxy ETR. This IID may be used as an encapsulation IID to encapsulate the packets sent towards the proxy tunnel router as a result of a NMR. When a 0.0.0.0 entry is added in a map cache at an edge node or tunnel router, if a 'use-petr' configuration is configured with an IID, that IID may be added as an encapsulation IID.

The present disclosure discloses devices, methods and/or systems that may correspond to multicast support. For LISP overlay with extranet, headend multicast may be supported across extranet IIDs. Multicast packets may have a multicast group address as a destination. The multicast group address may not be searched in a mapping system to find an encapsulation IID to be used with multicast packets.

If the destination or encapsulation IID is encapsulated in multicast packets at the sender side, multiple copies of the multicast packet with each extranet IID may be sent from the sender side, which may be inefficient. To avoid inefficiency, LISP may configure a dummy shared or provider VRF with the subscriber end VRF or VRFs of the extranet. Multicast replication may be done from the dummy or shared VRF to subscriber VRFs after receiving a multicast packet in the dummy or shared VRF at the subscriber end, which may be more efficient. This dummy or shared VRF configuration may be used to support multicast with extranet. The dummy or shared configuration may not be used if multicast is not used or configured.

The present disclosure discloses devices, methods, and/or systems that may be used in connection with LISP protocol message encoding.

To support LISP IID leaking, the LISP protocol messages of map reply and RLOC probe may carry IIDs, e.g., one or more of an encapsulation IID or a source IID. This can be done using LISP canonical address format (LCAF) encoding for the IID as disclosed in Moreno et al., "LISP Virtual Private Networks (VPNs)." A home IID may be encoded in a dedicated LCAF type. A dedicated LCAF type may be used to include application semantics for the encoding of the IID in a structured type.

A dedicated LCAF type may be used to encode the IID. The home IID may be the IID of the other context that is not encoded as the endpoint identifier IID in the message. The source EID AFI or a private LCAF type may be used to carry an additional EID IID. An EID record may be used to carry a source IID.

When replying to a map request, the MSMR may look up the destination prefix in a mapping table of the source IID context. If the MSMR finds the mapping and the mapping is not a shared IID, there may be no change in the mapping. If the MSMR does not find the mapping, and if the source IID is part of the shared EID record policies configuration, the MSMR may look up a destination prefix in an extranet policy table to find a destination IID. When the MSMR finds a destination IID, it may look up the mapping in the destination IID context and may force a proxy reply to the ITR.

When proxy replying, the MSMR may send the map reply with a remote mapping. The remote mapping may be in the context of the source IID but may include a destination IID, an extranet IID, or an encapsulation IID as a parameter to be used for encapsulation at a tunnel router. While installing the map cache in the context of the source IID, the ITR may install the destination VRF IID as the encapsulation IID with the EID and RLOC to encapsulate the packets towards the remote destination.

In some implementations, overlapping prefixes may not be allowed in the different IIDs of the extranet.

The present disclosure discloses devices, methods, and/or systems for supporting overlapping prefixes within an instance. In some implementations, the devices, methods, and/or systems described herein may support overlapping prefixes for extranet.

The present disclosure discloses devices, methods and/or systems that, in some implementations, may have an impact on extranet flows from fast roaming support and notification to a proxy tunnel router or vice versa.

As described herein, in some implementations, LCAF encoding may support an extranet.

In some implementations, the devices, methods, and/or systems described herein may be associated with a control plane multicast protocol. In some implementations, the devices, methods, and/or systems described herein may be associated with multicast for an extranet. An extranet may be associated with multicast.

In some implementations, the devices, methods, and/or systems described herein may be associated with a CLI syntax that indicates bidirectionality or duplexity of the extranet CLI.

In some implementations, NMR encoding may be the same as or similar to a map reply. Since NMR is recognized by a number of locator records, the devices, methods, and/or systems may not use a locator record to encode an extra IID.

In some implementations, the devices, methods, and/or systems described herein may encode an extra IID as an EID record with a private LCAF type.

In some implementations, the devices, methods, and/or systems described herein may not use another EID record to carry a source IID, but may use a source EID address field (AFI) or use a LCAF type to carry an additional source EID IID.

In some implementations, multicast may be used for headend replication. In some implementations, multicast may use a similar mechanism as used for a multicast virtual private network (MVPN). In some implementations, LISP VRF leaking may not be related to a MVPN feature.

An extranet may support dynamic registrations. A prefix or prefix list may be optional.

Figure 6:
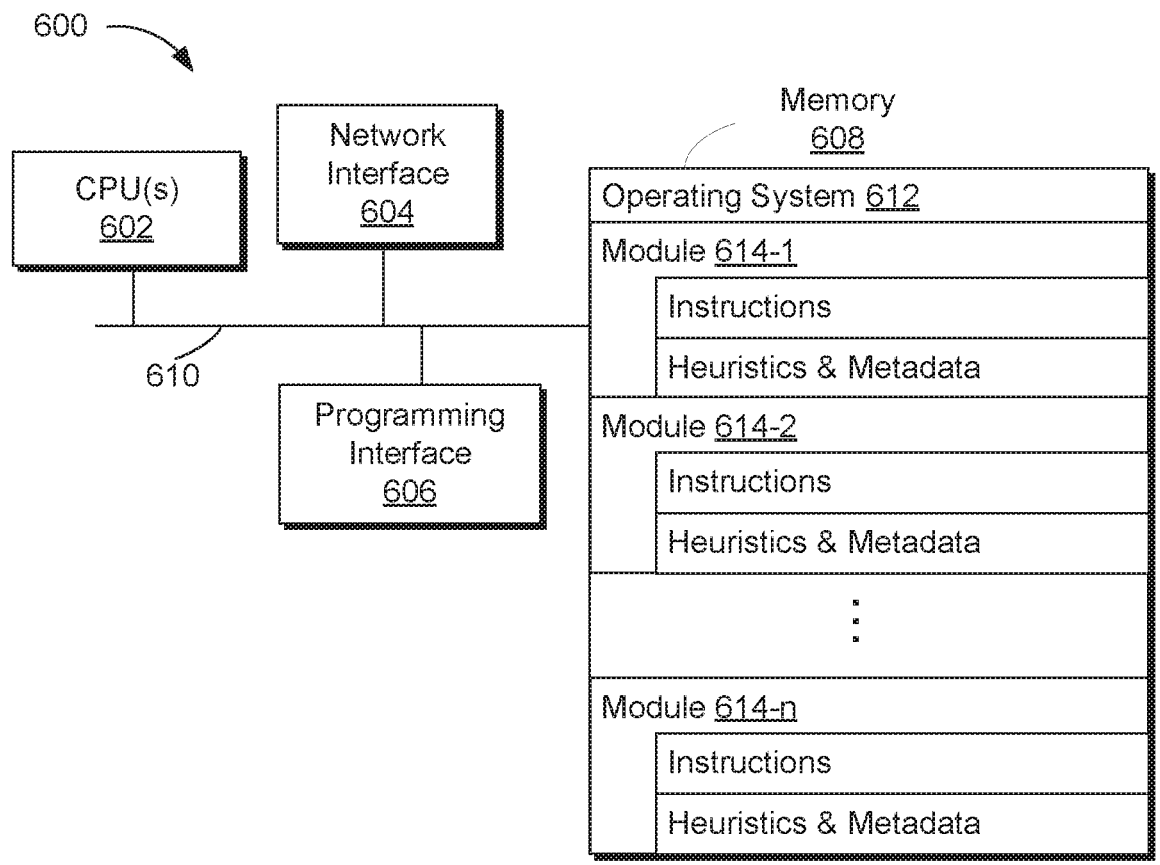
FIG. 6 is a block diagram that illustrates an example server system.

FIG. 6 is a block diagram of an example server system 600 enabled with one or more components of a device, server, or system in accordance with some implementations. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the server system 600 may include one or more processing units (CPUs) 602, a network interface 604, a programming interface 606, a memory 608, and one or more communication buses 610 for interconnecting these and various other components.

The network interface 604 may be provided to, among other uses, establish and/or maintain a metadata tunnel between a cloud-hosted network management system and at least one private network including one or more compliant devices. In some implementations, the communication buses 610 may include circuitry that interconnects and controls communications between system components. The memory 608 may include one or more of high-speed random access memory, such as DRAM, SRAM, DDR RAM, or other random access solid state memory devices; and may include non-volatile memory, such as one or more magnetic disk storage devices, optical disk storage devices, flash memory devices, or other non-volatile solid state storage devices. The memory 608 may include one or more storage devices remotely located from the CPU(s) 602. The memory 608 may comprise a non-transitory computer readable storage medium.

In some implementations, the memory 608 or the non-transitory computer readable storage medium of the memory 608 may include (e.g., store) the following programs, modules, and data structures, or a subset thereof including one or more of an operating system 612 or various modules 614-1, 614-2 . . . 614-n. The modules 614-1, 614-2 . . . 614-n, individually and/or collectively, perform one or more of the operations described herein. To that end, in various implementations, the modules 614-1, 614-2 . . . 614-n may include respective instructions and/or logic, and heuristics and metadata.

Various aspects of implementations within the scope of the appended claims are described above. It should be apparent that the various features of implementations described above may be embodied in a wide variety of forms and that any specific structure and/or function described above is merely illustrative. Based on the present disclosure, one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   receiving, at a first node, a request from a source host associated with a network to communicate with a destination host;
   determining whether the destination host is associated with the network;
   on a condition that the destination host is not associated with the network, determining an instance identifier (IID) and a proxy egress tunnel router (PETR) locator address used to communicate with the destination host;
   sending an indicator to an ingress tunnel router (ITR) to encapsulate a packet with the IID and the PETR locator address before sending the packet from the source host to the destination host wherein at least one of a source IID or a destination IID is associated with a virtual network used to send the packet from the source host to the destination host; and
   configuring the ITR with the IID and the PETR locator address associated with the virtual network.

2. The method of claim 1, wherein determining the IID and the PETR locator address used to communicate with the destination host comprises looking up a destination prefix in an extranet policy table.

3. The method of claim 1, further comprising:
   generating a policy as a function of the IID and the PETR locator address; and
   sending an unknown map reply (UMR) comprising the policy to the ITR.

4. The method of claim 1, wherein the IID comprises an encapsulation IID, the method further comprising using a proxy egress tunnel router (PETR) configuration at the ingress tunnel router (ITR) to determine the encapsulation IID and the PETR locator address.

5. The method of claim 1, wherein the IID and the PETR locator address are associated with a shared virtual routing and forwarding (VRF) instance.

6. The method of claim 1, further comprising:
   configuring a mapping system with the IID and the PETR locator address; and
   sending a reply from the mapping system, the reply comprising the IID and the PETR locator address.

7. The method of claim 1, further comprising encoding the IID and the PETR locator address.

8. A device comprising:
   a network interface in communication with a network;
   a processor configured to execute computer readable instructions included on a non-transitory memory; and
   a non-transitory memory including processor-readable instructions, that when executed by the processor, cause the device to:
      receive a request from a source host associated with the network to communicate with a destination host;
      determine whether the destination host is associated with the network;
      on a condition that the destination host is not associated with the network, determine an instance identifier (IID) and a proxy egress tunnel router (PETR) locator address used to communicate with the destination host;
      send an indicator to an ingress tunnel router (ITR) to encapsulate a packet with the IID and the PETR locator address before sending the packet from the source host to the destination host; and
      generate a policy as a function of the IID and the PETR locator address;
      send an unknown map reply (UMR) comprising the policy to the ITR.

9. The device of claim 8, wherein at least one of a source IID or a destination IID is associated with a virtual network used to send the packet from the source host to the destination host.

10. The device of claim 9, wherein the processor-readable instructions cause the device to configure the ITR with the IID and the PETR locator address associated with the virtual network.

11. The device of claim 8, wherein determining the IID and the PETR locator address used to communicate with the destination host comprises looking up a destination prefix in an extranet policy table.

12. The device of claim 8, wherein the IID comprises an encapsulation IID, and wherein the processor-readable instructions cause a proxy egress tunnel router (PETR) configuration to be used at the ingress tunnel router (ITR) to determine the encapsulation IID and the PETR locator address.

13. The device of claim 8, wherein the IID and the PETR locator address are associated with a shared virtual routing and forwarding (VRF) instance.

14. The device of claim 8, wherein the processor-readable instructions cause the device to:
   configure a mapping system with the IID and the PETR locator address; and
   sending a reply from the mapping system, the reply comprising the IID and the PETR locator address.

15. The device of claim 8, wherein the processor-readable instructions cause the device to encode the IID and the PETR locator address.

16. The device of claim 8, wherein the device comprises at least one of a map server map resolver (MSMR) device or a gateway device.

17. A non-transitory computer readable storage medium storing one or more programs, the one or more programs comprising instructions, which, when executed by a computing device with a non-transitory memory and one or more processors, cause the computing device to perform or cause performance of:
   receiving a request from a source host associated with a network to communicate with a destination host;
   determining whether the destination host is associated with the network;
   on a condition that the destination host is not associated with the network, determining an instance identifier (IID) and a proxy egress tunnel router (PETR) locator address used to communicate with the destination host;
   sending an indicator to an ingress tunnel router (ITR) to encapsulate a packet with the IID before sending the packet from the source host to the destination host; and
   encoding the IID and the PETR locator address.

18. The non-transitory computer readable storage medium of claim 17, further comprising:
   generating a policy as a function of the IID and the PETR locator address; and
   sending an unknown map reply (UMR) comprising the policy to the ITR.

19. The non-transitory computer readable storage medium of claim 17, wherein the IID comprises an encapsulation IID, the method further comprising using a proxy egress tunnel router (PETR) configuration at the ITR to determine the encapsulation IID and the PETR locator address.

20. The non-transitory computer readable storage medium of claim 17, further comprising:
   configuring a mapping system with the IID and the PETR locator address; and
   sending a reply from the mapping system, the reply comprising the IID and the PETR locator address.

* * * * *